US006544025B1

(12) United States Patent
Steffen et al.

(10) Patent No.: US 6,544,025 B1
(45) Date of Patent: Apr. 8, 2003

(54) CONCRETE COMPACTING DEVICE WITH VIBRATION SENSOR AND CONTROL UNIT

(76) Inventors: Michael Steffen, Kreuzweg 32, D-82131 Stockdorf (DE); Christian Glanz, Gündiger Str., D-85221 Dachau (DE)

( * ) Notice: Subject to any disclaimer, the term of this patent is extended or adjusted under 35 U.S.C. 154(b) by 0 days.

(21) Appl. No.: 09/646,483

(22) PCT Filed: Mar. 15, 1999

(86) PCT No.: PCT/EP99/01692

§ 371 (c)(1), (2), (4) Date: Oct. 15, 2000

(87) PCT Pub. No.: WO99/47322

PCT Pub. Date: Sep. 23, 1999

(30) Foreign Application Priority Data

Mar. 16, 1998 (DE) ........................................ 198 11 344

(51) Int. Cl.[7] ................................................ B29C 39/02

(52) U.S. Cl. ........................ 425/150; 425/432; 425/456

(58) Field of Search .......................... 425/150 OR, 145, 425/432, 421, 456; 164/154.1, 478

(56) References Cited

U.S. PATENT DOCUMENTS 5,458,182 A * 10/1995 Aoki et al. .............. 164/154.2

FOREIGN PATENT DOCUMENTS

| | | |
|---|---|---|
| DE | 36 40 079 A | 6/1988 |
| DE | 40 30 665 C | 10/1991 |
| DE | 44 00 839 A | 7/1995 |
| DE | 195 42 868 A | 5/1997 |
| DE | 297 12 242 U | 9/1997 |
| JP | 5-156811 * | 6/1993 |

OTHER PUBLICATIONS

Zanker, G., "*Modern Vibration Techniques in the Precasting Plan —Illustrated on the Example of the Mayreder/Elster Works*", Betonwerk+Fertigteil Technik, Bd. 59, No. 12, Dec. 1, 1993.

* cited by examiner

*Primary Examiner*—Jan H. Silbaugh
*Assistant Examiner*—Thu Khanh T. Nguyen
(74) *Attorney, Agent, or Firm*—Boyle Fredrickson Newholm Stein & Gratz S.C.

(57) ABSTRACT

The invention relates to a concrete compacting device for compacting plastically deformable concrete in a formwork, comprising at least one vibrating unit which is attached to the formwork and has a vibration-generating unit. The compacting device is characterized in that the vibrating unit comprises an acceleration sensor for generating a signal corresponding to a vibration generated by the vibration-generating unit at the level of the formwork, and a control unit which is impinged upon by said signal and serves to control operating parameters of the vibration-generating unit.

10 Claims, 1 Drawing Sheet

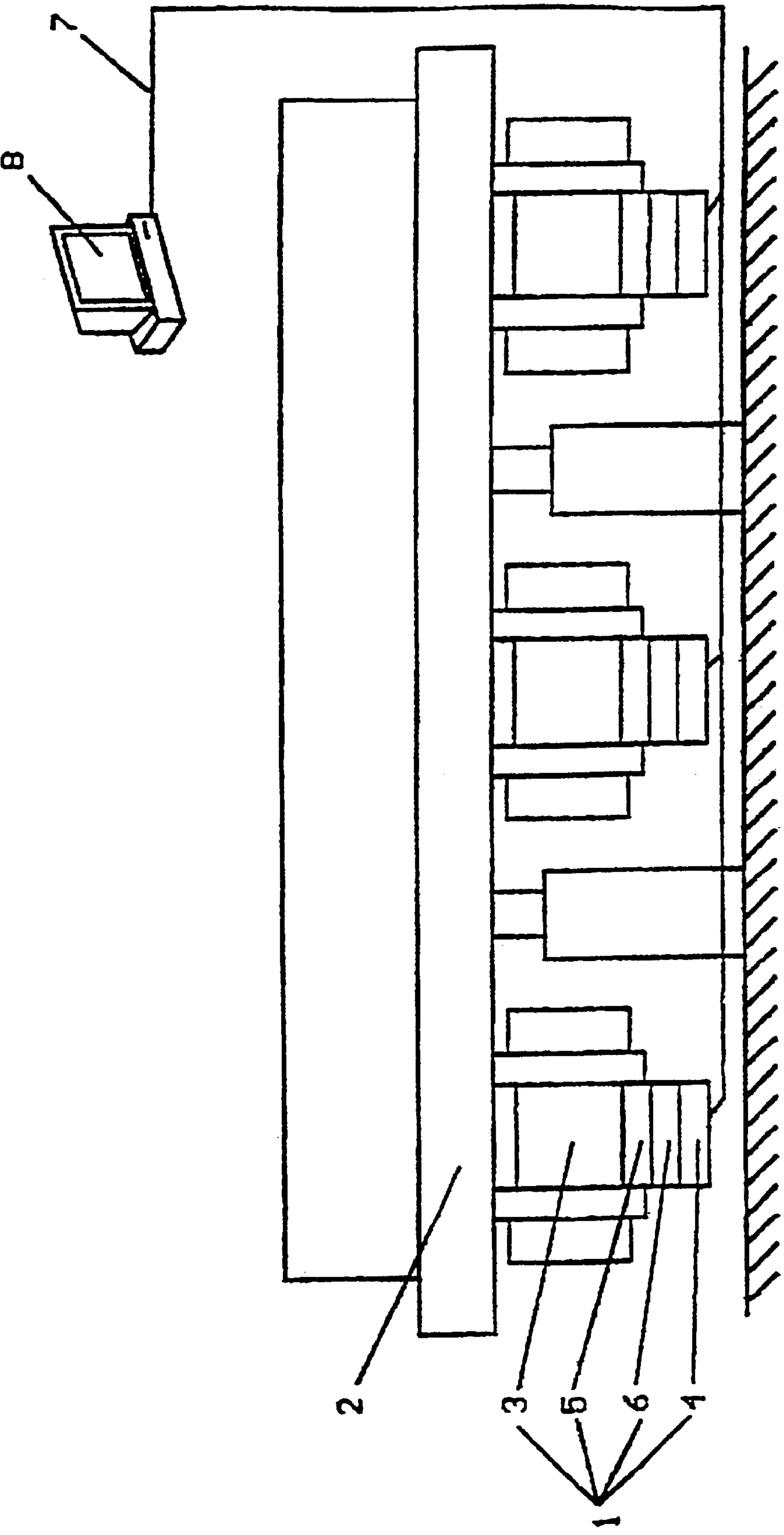
7
8
2
3
5
6
4
1

CONCRETE COMPACTING DEVICE WITH VIBRATION SENSOR AND CONTROL UNIT

BACKGROUND OF THE INVENTION

1. Field of the Invention

This invention pertains to a concrete compaction system.

2. Description of the Related Art

The purpose of a system of this type is to compact concrete while it is still plastically deformable after it has been filled into a form for the production of concrete parts. There are at least one, and commonly more vibration units fastened to the forms that frequently each have an external vibrator. This type of external vibrator commonly consists of a motor that drives one or more eccentric elements consisting of centrifugal weights, thus producing an oscillation that is transferred to the forms by means of a fixed connection. By vibrating the forms, the concrete can be compacted in the desired fashion.

Commonly, a number of external vibrators are arranged at the forms for larger concrete parts. All of these vibrators are coupled to a common frequency converter that provides an electrical AC current at the desired frequency for the electric motors that are connected together.

In practice, the problem frequently arises that certain areas of the forms and thus certain parts of the concrete are not sufficiently vibrated and thus not compacted. When the user has recognized this problem he commonly raises the frequency provided by the frequency converter. However, the increase in frequency affects all connected external vibrators at the same time, independent of whether the vibrators are located near the weakly agitated concrete or at a position with already strong agitation. This results in a considerable amount of noise and loading of material, which is disadvantageous both for the user as well as for the forms.

From DE 195 42 868 A1, a concrete compaction system is known with two vibration units fastened to one form, each having one oscillator.

Acceleration sensors fastened to the vibration units detect the oscillation of each form and the signal detected is forwarded to a common signal-processing unit. At the signal-processing unit, a subsequent data-processing logic algorithm issues a prognosis on the product quality to be expected of the concrete form parts from the measured values and from stored comparison values.

The central controller that governs all vibration units requires a very exact determination of the parameters possible during operation in advance. To this end, it is suggested that, for example, an expert catalog be stored in memory. Thus, the adjustment of the compaction system for various form parts and in operating more than two vibration units requires a very considerable amount of work to establish the expert catalog.

A similar system is known from DE 297 12 242 U1. Here, a number of oscillators are provided at a vibrator table. The frequency of the oscillators and relative phase position are individually adjustable. In addition, a number of sensors are located at the vibrator table that detect the overall reaction, i.e. the overall oscillation of the vibrator table and send this as a measured signal to a common controller. In this system, it is also required that expensive regulatory algorithms, characteristic fields, etc. be stored in memory in the vector regulators acting as the controller in order to obtain the desired complex oscillation reactions. Otherwise, the information from the sensors cannot be satisfactorily evaluated.

A basically similar design is given in DE 36 40 079 A1.

OBJECTS AND SUMMARY OF THE INVENTION

The objective of the invention is to provide a concrete compaction system in which only those areas of the forms not oscillating with the desired intensity are agitated stronger, wherein a flexible and simple adjustment of the concrete compaction system to various form geometries and a varying numbers of external vibrator is the goal.

According to the invention, the objective is met by means of a concrete compaction system with the features recited in the claims. Advantageous developments of the invention are found in the dependent claims.

According to the invention, a number of vibration units are provided that each has its own oscillator, its own acceleration sensor, its own frequency converter and its own controller. In this way, the intensity of the oscillation at the individual points of the form can be very exactly and individually adjusted by controlling the individual vibration units. In order to enable a coordination of the controls, in an advantageous development the controls of each of the vibration units are coupled through a data line to one another. The data line can also be connected to a common control processor that serves to individually control the vibration units.

The solution according to the invention makes it possible to detect, through the acceleration sensor, the oscillations acting on the form. A constantly changing acceleration value corresponding to the oscillation is sent to the controller, which can vary the operating parameters of the oscillator accordingly in order to produce the desired oscillation at the form. Thus, for example, it is possible that the controller raises the frequency of the oscillator if the acceleration sensor has detected an oscillation of the form that is too low.

By adjusting the frequency converter through the controller, it is possible to vary the oscillation frequency of the oscillator in a simple manner.

In an especially advantageous embodiment form of the invention, the acceleration sensor is fastened to the oscillator or to the form. In this way, it is possible that the acceleration sensor can either sense the oscillation directly at the form or—due to the oscillator being rigidly fixed to the form—at the oscillator that experiences the same oscillation.

The target values for the individual controls provided at the vibration units can be the frequency of the oscillator, a target acceleration or an allowable control range within which the individual controls can adjust the oscillator depending on the measured oscillation signal.

BRIEF DESCRIPTION OF THE DRAWINGS

These and other advantages and features of the invention are explained in more detail below with the help of an example and with reference to the figure. The figure shows schematically the construction of the concrete compaction system according to the invention.

DETAILED DESCRIPTION OF THE PREFERRED EMBODIMENT

A concrete compaction system according to the invention has a number of vibration units 1 that each are located on an form 2, which is also only schematically shown, the purpose of which is to contain the fluid concrete. The vibration unit 1 consist each of an external vibrator 3 serving as the oscillator that is fastened rigidly to the form 2 as well as a frequency converter 4, an acceleration sensor 5 and a controller 6. To simplify the illustration, only the construction of one of the vibration units 1 is shown in the figure.

The external vibrator 3, which is of known design, consists essentially of an electric motor and one or two centrifugal weights driven by the motor that effect the required imbalance necessary to produce the desired oscillations when rotated. In order to transfer the oscillations with as low losses as possible to the form 2, the external vibrator 3 must be rigidly connected to the form 2. As described above, the external vibrator 3 is known as such so that no further description is necessary and it is not shown in the figure.

In order to be able to adjust the oscillation frequency, a frequency converter 4 is connected prior to the electric motor of the external vibrator 3 that is connected in known fashion to a power source. The frequency converter 4 converts the power frequency into a suitable frequency for the external vibrator 3. Whereas feeding all external vibrators 3 connected to the form 2 from one frequency converter 4 is a known method, according to the invention each external vibrator 3 has its own frequency converter.

In the figure, the frequency converter 4 is located directly at the external vibrator 3. Depending on the embodiment form, it can, however, also be appropriate to provide the frequency converter 4 in a separate cabinet, which is not shown, to the side of the external vibrator 3.

A component of the vibration unit 1 is the acceleration sensor 5 that is preferably attached either at the external vibrator 3 or directly on the form 2 in order to be able to detect the produced oscillation as precisely as possible. The acceleration sensor 5 records the accelerations created by the oscillation acting on the form 2 and produces a signal from this that is fed to the controller 6.

The controller 6 can also be implemented as a regulator—depending on the configuration of the invention—that adjusts the frequency converter 4 based on the acceleration values measured by the acceleration sensor 5 and based on a corresponding prescribed target value. In addition to the measured oscillation frequency, the measured acceleration values are also suitable parameters. An allowable control range or even a characteristic field can be stored in memory in the controller 6. Using this, the controller 6 influences the operation of the external vibrator 3 while taking into account the signal from the acceleration sensor 5.

If a number of vibration units 1 are fastened to the form 2, it can be especially advantageous, according to an embodiment form of the invention, if the vibration units 1 or their respective controllers 6 are coupled together through a data line 7. Using the data line 7 designed as a data bus, for example, the controllers 6 can exchange information with one another and mutually inform themselves concerning specific operation conditions.

In the especially advantageous embodiment form of the invention shown in the figure, the data line 7 is, in addition, coupled to a control processor 8, through which each individual controller 6 can be adjusted centrally. Each controller 6 receives from the control processor 8 the operating parameters in the form of target values for the respective manufacturing step in producing the concrete parts. The control processor 8 provides each individual controller 6 with the frequency at which the external vibrator 3 should operate at this point in time, or it provides the acceleration value that is to be attained. In addition, the control processor 8 can also transmit a corresponding allowable control range to the controller 6 within which the controller 6 can adjust the external vibrator 3 according to the stored control program.

The control processor 8 makes it possible to run the vibration units 1 at first with a low frequency when filling the fluid concrete into the form 2 so that excessive noise generation can be prevented. In the subsequent compaction process, the control processor 8 increases the frequency of the external vibrator 3. Each local controller 6 determines, by means of the respective acceleration sensors 5, whether the associated external vibrator 3 has reached the required acceleration at the form 2. If the measured acceleration is not sufficient, the controller 6 increases the frequency of the external vibrator 3 by means of the frequency converter 4. On the other hand, if the acceleration is too high, the frequency is lowered.

Depending on the type of motor on the external vibrator 3, it is also possible to influence the position of the rotors or centrifugal weights in relationship to one another at constant frequency, thus influencing the forces and accelerations acting on the form. The relative position of the rotors influences, in a known fashion, the center of gravity of the eccentric elements and thus the intensity of the resultant force vector at the respective point in time.

Since the concrete compaction system according to the invention can be implemented for a wide variety of oscillator types, it is obvious that in some cases it is not required to use a frequency converter 4 if the oscillation acting on the form 2 can be affected using the controller 6 in other ways as well. The example described above thus serves only to elaborate on the invention, but not to limit the scope of its protection.

What is claimed is:

1. A concrete compaction system for compacting plastically deformable concrete, the concrete compaction system comprising:

a form, and at least two vibration units that are fastened to the form and that each have an oscillator, an acceleration sensor configured to generate an oscillation signal that corresponds to an oscillation produced at the form by the oscillator, a controller that receives the oscillation signal and that adjusts at least one operating parameter of the oscillator in response to the oscillation signal, as well as a frequency converter that is acted upon by the controller and that is coupled to the oscillator.

2. A concrete compaction system according to claim 1, wherein the oscillator comprises an external vibrator.

3. A concrete compaction system according to claim 1, wherein the acceleration sensor is fastened to the oscillator or to the form.

4. A concrete compaction system according to claim 1, wherein the controllers of the respective vibration units are coupled together through a data line.

5. A concrete compaction system according to claim 4, wherein the controllers of the respective vibration units are controlled through a control processor connected to the data line.

6. A concrete compaction system according to claim 4, wherein the controllers are provided with target values.

7. A concrete compaction system according to claim 6, wherein the target values are input by the control processor.

8. A concrete compaction system according to claim 1, wherein the operating parameter is an oscillation frequency.

9. A concrete compaction system according to claim 1, wherein the operating parameter is a vibrational magnitude.

10. A concrete compaction system according to claim 4, wherein the controller of each of the respective vibration units adjusts the operation of the respective vibration unit in coordination with the operation of at least one other vibration unit.

* * * * *